United States Patent [19]

Carruth, Jr.

[11] Patent Number: 4,661,934

[45] Date of Patent: Apr. 28, 1987

[54] GROUND POSITION CONTROLLER AND METHOD FOR AUTOMATICALLY INDICATING PARAMETERS THAT SPATIALLY CROSS-REFERENCE THE LOCATIONS OF SEISMIC SPREAD AND SOURCE ARRAYS DURING EXPLORATION FOR HYDROCARBONS AND THE LIKE

[75] Inventor: H. T. Carruth, Jr., Anaheim, Calif.

[73] Assignee: Chevron Research Company, San Francisco, Calif.

[21] Appl. No.: 169,345

[22] Filed: Jul. 16, 1980

[51] Int. Cl.⁴ .......................... G01V 1/28; G01V 1/24
[52] U.S. Cl. ......................................... 367/37; 367/19; 367/60; 346/33 C; 364/421
[58] Field of Search ...................... 367/14, 37, 55, 56, 367/60, 63, 71, 74, 19; 346/33 C; 364/421, 200, 900

[56] References Cited

U.S. PATENT DOCUMENTS

| | | | |
|---|---|---|---|
| 3,840,845 | 10/1974 | Brown | 367/19 |
| 4,068,208 | 1/1978 | Rice et al. | 367/19 |
| 4,202,048 | 5/1980 | Edwards et al. | 367/60 |
| 4,214,128 | 7/1980 | Bovee et al. | 367/60 |
| 4,231,111 | 10/1980 | Neeley | 367/19 |
| 4,257,098 | 3/1981 | Lacy | 371/33 |
| 4,280,201 | 7/1981 | Mart et al. | 367/56 |
| 4,285,052 | 8/1981 | Bobbitt | 367/56 |
| 4,323,990 | 4/1982 | Goode et al. | 367/60 |

*Primary Examiner*—Nelson Moskowitz
*Attorney, Agent, or Firm*—D. A. Newell; E. J. Keeling; H. D. Messner

[57] ABSTRACT

The present invention relates to a ground position controller utilizing a microcomputer system interconnected to a digital field system (DFS) via a system bus, for generating, formatting and displaying information (for insuring integrity of field operations) under a variety of shooting and collecting conditions.

11 Claims, 7 Drawing Figures

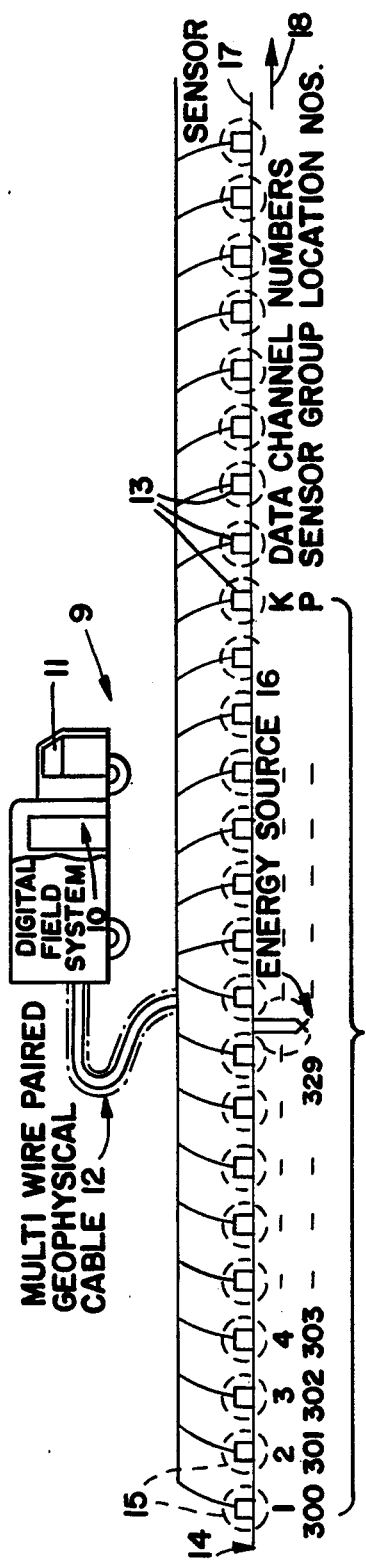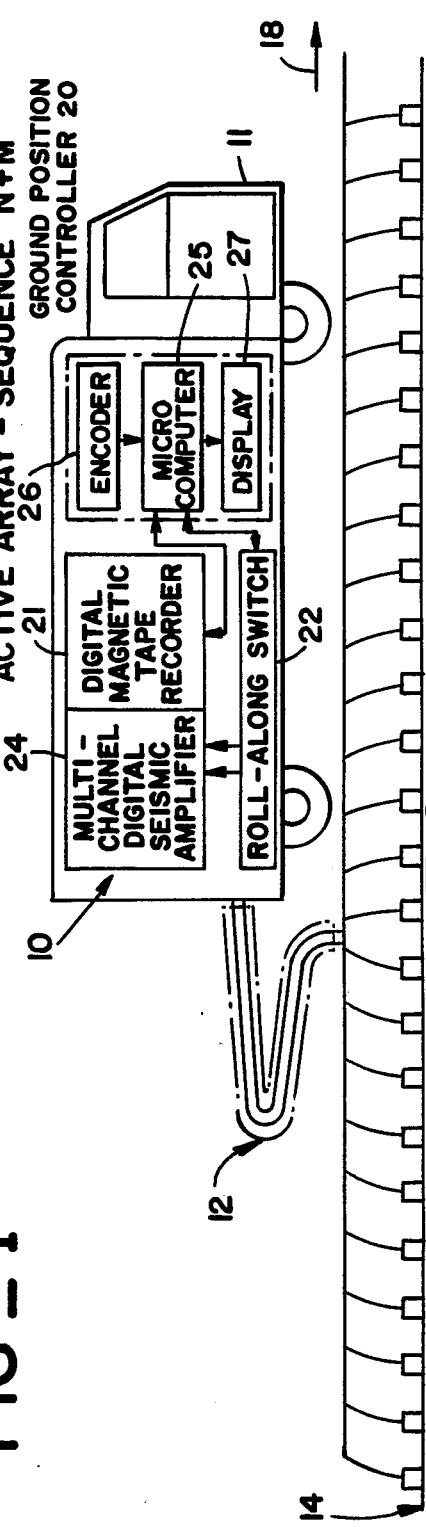

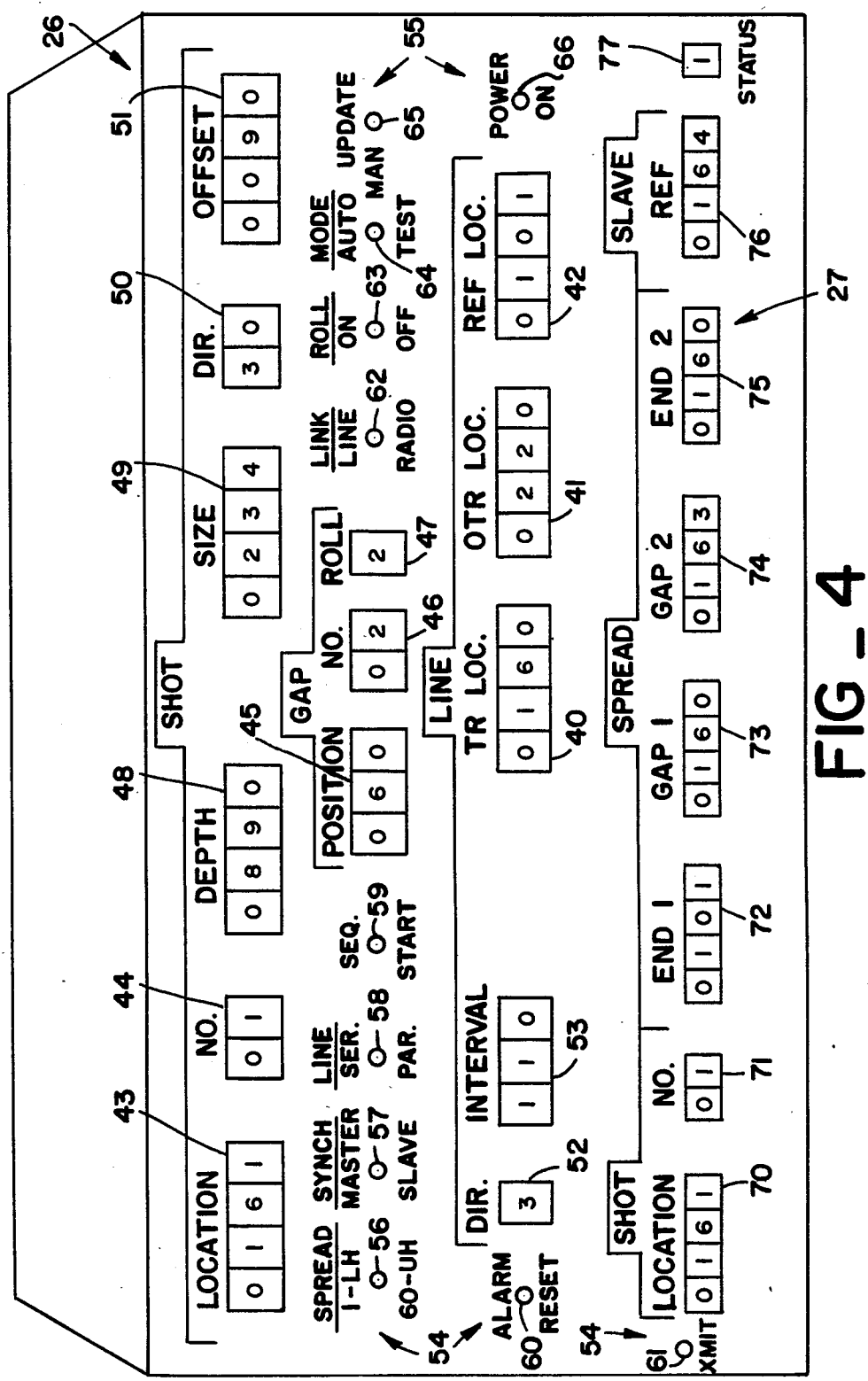
FIG_4

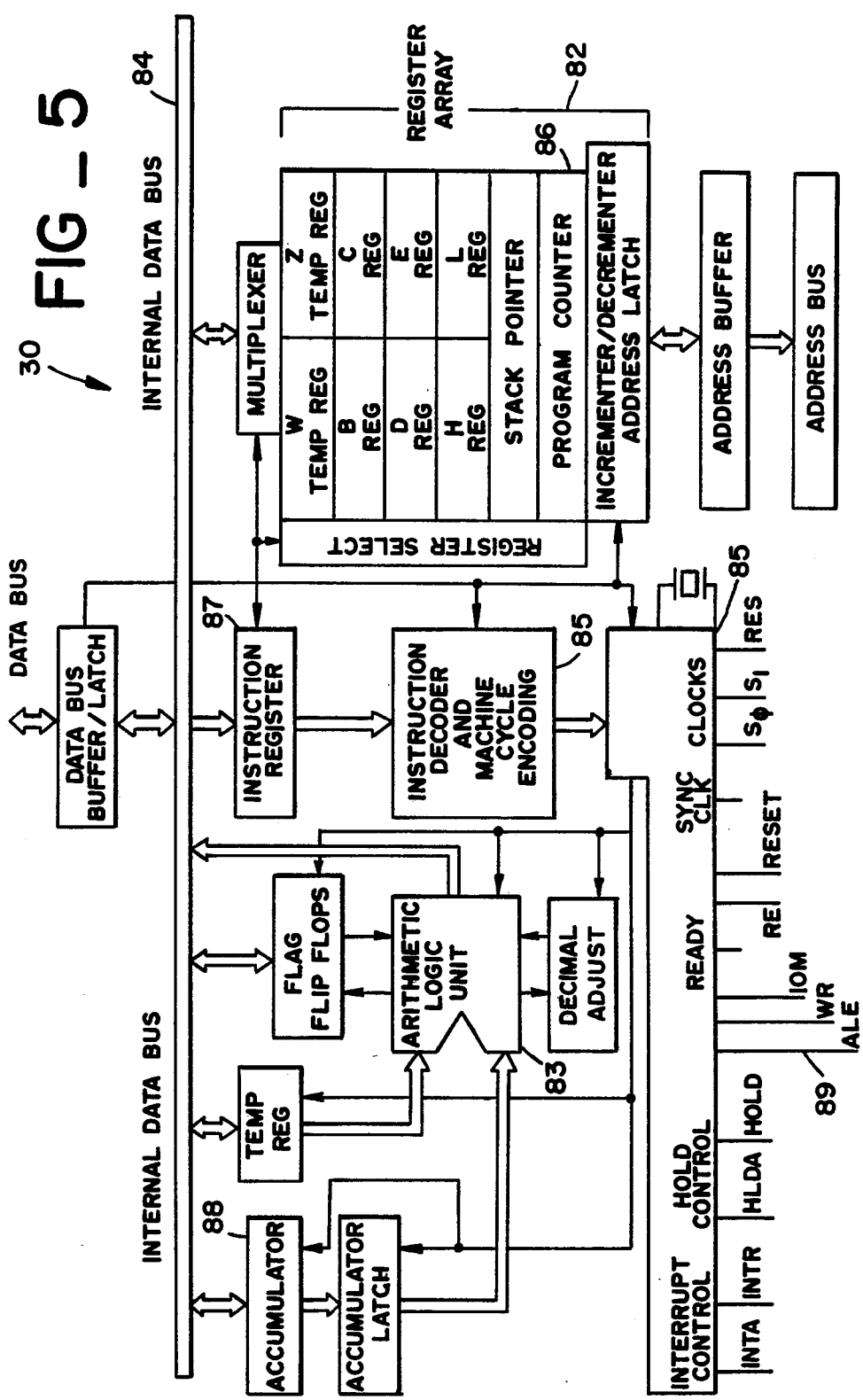
FIG_5

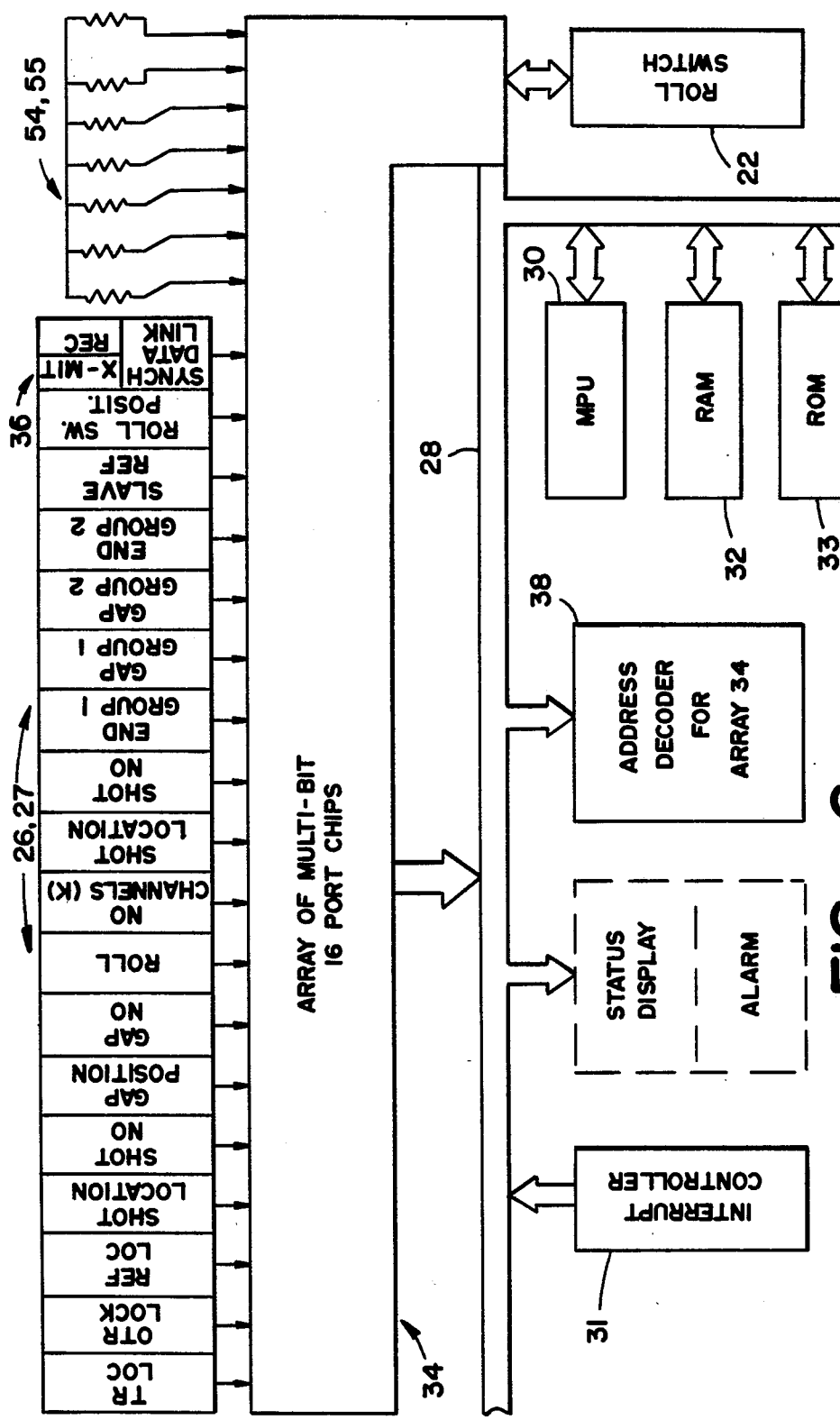
FIG_6

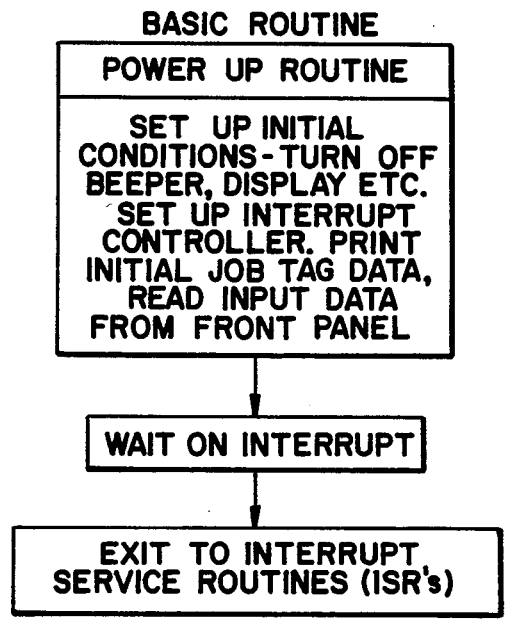
FIG_7A
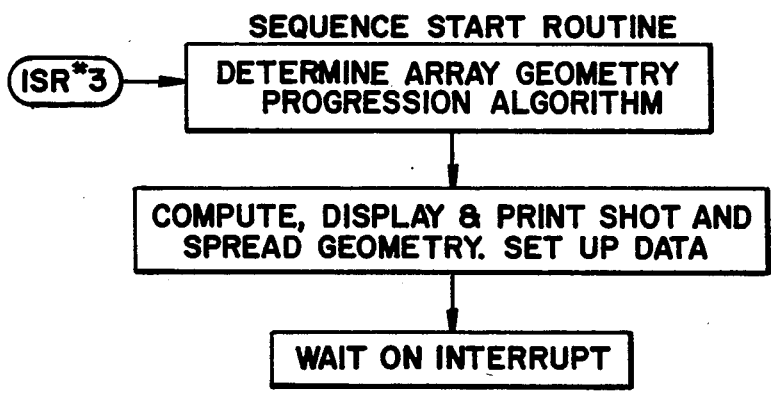
FIG_7B

GROUND POSITION CONTROLLER AND METHOD FOR AUTOMATICALLY INDICATING PARAMETERS THAT SPATIALLY CROSS-REFERENCE THE LOCATIONS OF SEISMIC SPREAD AND SOURCE ARRAYS DURING EXPLORATION FOR HYDROCARBONS AND THE LIKE

SCOPE OF THE INVENTION

This invention relates to seismic exploration and more particularly to methods and apparatus for insuring integrity of field shooting and collection operations during exploration for hydrocarbons and the like.

In one aspect, the present invention provides for dynamic control of the field shooting and collection operations so that the latter, actually correspond to the advanced specifications for those operations; in another aspect, the present invention provides for generating, formatting and displaying of data so that spread and source geometries, can be generated and displayed for both present and next-in-time shooting and recording sequences. As a consequence, the field observer can scan the results and offer criticism, if necessary.

BACKGROUND OF THE INVENTION

In seismic exploration, proposed prescriptions for shooting (or vibrating) and collection operations must be followed—precisely—in the field. Such is particularly important in field techniques involving so-called Common Depth Point Recording (or CDPR) operations in which changing sets of sensors were used in association with successive shots to provide multiple stacked recordings. (In all of the following teachings, the words "shots" and "shooting" will be used for the part of the operation in which the sound waves are generated and sent down into the sub-surface. It will be appreciated, however, by those skilled in the art, that the same teachings apply where the sound waves are generated by large vibrators at the surface rather than by explosive shots.)

In the CDPR process, sensors and energy sources are positioned at a first series of spatially (geometrically) related locations, to produce a first record. Subsequent records are then made with the sensors and energy source occupying new locations. However, the sensors and energy source normally maintain a similar spatial relationship to each other.

Advancement of the source sensor locations (in CDPR operations) employ a technique commonly known as "rollalong". In the rollalong technique the sensor array is not physically lifted up and relocated for every advancement in position. Instead, a larger array of sensors than is needed at any one time is laid down along a line of survey, and subsets of that larger array (called the "active" array) are selected one at a time, for seismic collection purposes, progressing along the larger array. Relative advancement of the subsets is commonly done in a very rapid manner using a switching device called a rollalong switch (such as shown, e.g., in my U.S. Pat. No. 3,618,000, Nov. 2, 1971 for "Rollalong Switch",), in which a large number of sensors can be controllably provided at any programmed interval along the recording line. Through the use of multiple pair cables extending along the line, these sensors are connected into the input receptables of the rollalong switch. The design of the switch permits the "active" array of sensors to be interconnected to the input of the geophysical seismic recorder and keeps track of the position of one end of the "active" array relative to the number of recording channels available (say any position within 1-in-60 channels). Not only can the switch select any contiguous group of sensors, from the total number positioned along the line, but it can also add gaps in the active spread using one or more "inactive" groups as the gapping members. This technique is usually used when a large energy source is positioned at the center of the active array, because the horizontal energy received at the near sensors would be so strong that it would mask out the weaker reflected energy that is of primary interest. (A "gapped" array for a 24-sensor record, for example, consists of sensors 1 through 12 and 15 through 26 with sensors 13 and 14 left disconnected by the rollalong switch).

Computer processing of the CDPR field data (now commonly done by large centralized computer facilities) requires not only the actual time versus amplitude seismic reflection data (recorded on field tapes), but also requires "housekeeping" data describing associated source and sensor geometry, as the former was collected. These latter data consist of, inter alia, positional locations for every sensor in each "active" array during the collection sequence, the location of the energy source, and the location and size of the gap (if any). To provide the above, the usual field procedure is to determine the ground locations by survey prior to the recording operations. The location and direction of the line is referenced to know geographic locations or geodetic survey points. The location of each sensor (or sensor group) and energy source is surveyed in and marked with a survey stake having an identification number representing a ground location. These locations are written down in the survey log for that particular seismic line. The surveyor's log thus contains part of the geometrical data that must be added to the seismic data after the latter has been recorded and is ready for processing.

Another requirement of the geometrical data is developed during the recording process. It relates to data entered into the "observer's" log. (The operator of the seismic recording system is commonly called the "observer"). The observer's log contains, for each record sequence, the spatial extent of the active sensors usually identified by ground locations of the sensors at each end of the active array. In the event that the active array contains a gap, the location of the gap will be specified relative to adjacent active sensor locations. The observer's log also contains the location of the energy source for each record. In some cases, when a pre-surveyed line is recorded, the energy source cannot be located at the location designated for it during the survey. In these situations, the shot location from the observer's log must be used in processing instead of the original survey data. The observer's log also contains information that infers or describes spatial irregularities in the active array imposed by field conditions when the line is recorded.

As previously indicated, the rollalong switch tracks the position of active array (for identifying the location of the "active" sensor array including gap). While some rollalong switch units provide for transferring such array information directly to the field recorder (recognizable as header data on the digital seismic tape) these data are not in terms of true ground location but in an arbitrary numbering sequence relative to a particular recording vehicle location. The true ground location of the recording vehicle must therefore be entered into the observer's log in order to convert rollalong switch positions to true ground locations.

The foregoing description of geophysical seismic data recording operations indicates conclusively, that collection of seismic reflection data must be supported by accurate and sufficient correlative data so as to accurately define spatial source and sensor geometry relative to a permanent geographical location. It also indicates that separate types of cross-checking materials, for documentation, are needed as the data is collected including the steps of generating, formatting and displaying spread and sound geometries for both present and next-in-time shooting and recording sequences.

SUMMARY OF THE INVENTION

One particularly useful embodiment of the invention comprises a ground position controller for generating, formatting and displaying information for insuring integrity of field shooting and collection operations. The controller includes sets of multi-digit numerical displays related to array and source geometry and operational parameters. E.g., an individual display can represent a particular type of field operation geometric specification, resulting from initial encoding operations or from individual calculations. As a result, the operator can examine collectively all displays and cross-check instructions versus actual operations before any shooting or collection operations is undertaken; the controller has also formatting capabilities whereby the associated "housekeeping" data is placed in a form suitable for automatic annotation of the seismic record. As a result, the final seismic record can contain data representing original array/source geometrical data unambiguously associated with the recorded bits representing the seismic data received from the subsurface as a result of the particular operational sequence. At the end of the recording cycle, the controller generates a series of new data: (i) new shooting and spread geometries, and (ii) positional skips (gaps) of the array. Then the shooting and collection sequence is repeated. Thus, the present invention translates original operational instructions into a form that the field operator can quickly cross-check via displays before operations are begun. Also, the present invention aids the operator in cross-checking and cross-listing data so that any deviation from the prescribed field procedure can be detected and corrected. Finally, coded geometrical descriptions of the actually used operations are unambiguously associatable with the seismic data received from the subsurface as a result of particularly-described field operations.

These and other functions of the present invention will become evident to those skilled in the art from the detailed description of preferred embodiments thereof, following this brief listing of the appended drawings.

DESCRIPTION OF THE INVENTION

FIGS. 1 and 2 illustrate an exploration system incorporating the present invention in which an energy source and an array of sensors are shown in association with a recording truck.

FIGS. 3 and 6 are block diagrams of the ground positioned controller of the present invention used within the exploration system of FIGS. 1 and 2.

FIG. 4 is an isometric view of a display panel of the controller of FIGS. 3 and 6.

FIG. 5 is a block diagram of a microprocessor unit of the controller of FIGS. 3 and 6.

FIGS. 7A-7B are flow diagrams which illustrate steps associated with the method of the present invention.

DESCRIPTION OF PREFERRED EMBODIMENTS OF THE INVENTION

Figure 3:
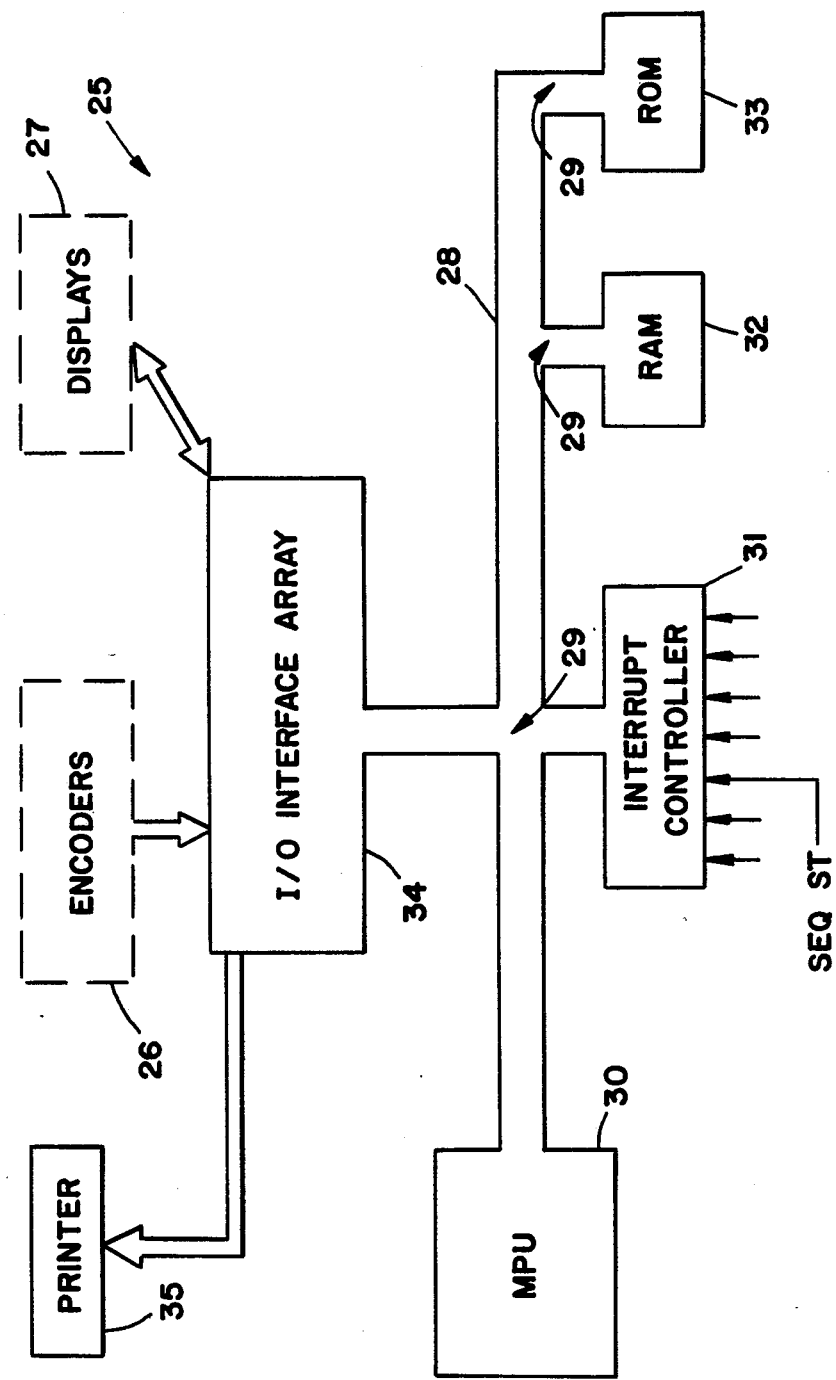

FIG. 1 illustrates operation of seismic exploration system 9 of the present invention.

As shown, system 9 includes digital field system 10, housed within recording truck 11 and electrically interconnected via a multiwire geophysical cable 12 to an array of sensors 13 positioned at the earth's surface 14. Ground locations 15 are represented as surrounding both the array of sensors 13 and a seismic energy source 16, all positioned along the surface 14. As previously mentioned in the CDPR collection process, the ground locations 15 would, more likely than not, have been previously surveyed prior to implimentation of the seismic surveying operation along the line of survey 17 in the direction of arrow 18. Hence, each of the locations 15 can be designated by a particular position number (P number) along the line 17. The P numbers set forth in FIG. 1 include the numbers 300, 301 . . . 329. Also, the number of sensors 13 forming each array (as the data is collected) is identified by the sequence numbers N, N+1 . . . N+M designating the length of the active array as the sensors 13 are advanced in the direction of arrow 18.

Annotating the positions of the sensor arrays is aided by the fact that each sensor is associated with a particular data channel 1, 2 . . . K, of the collection unit, as the data is collected. For usual operations K can be 24, 48, 60, 96, 120, etc. at required although, of course, the present invention is not limited to a particular channel capacity number, but can be varied to accommodate any field arrangement. Each sensor position and each source location can be indicated and displayed for operator approval using the ground position controller 20 of the present invention.

FIG. 2 illustrates ground position controller 20, in more detail.

Briefly, the controller 20 operates in the field to insure integrity between prescribed and actual field shooting and collection operations, by a series of steps, namely storing, manipulating and displaying data related (i) to field positions of the source and sensor array by position number, (ii) to array and source geometrical locations (both present and next-in-time) based on field geometrical algorithms and (iii) to cross-checking relationships between generated and proscribed source and sensor positions so that errors can be detected and corrections made, if required. For these purposes, the operator utilizes encoded data provided initially by him using encoders 26, manipulated results generated by the controller 20 based on part in stored relationships within the microcomputer 25 and, finally displayed data set forth in visual form at displays 27.

Since the present invention deals conveniently with the CDPR process, the array of sensors 13 and source of energy 16 are continually "rolled forward" in the direction of arrow 18 using rollalong switch 22 of FIG. 2. That is to say, after the seismic data has been recorded at the digital tape recorder 21 (after amplification by amplifier 24), the array of sensors 13 and source 16 previously associated with sequence number N, are "rolled forward" in the direction of arrow 18. Note that the changing of the active array pattern of FIG. 1 in the aforementioned manner is identified by the array sequence designated N, N+1 ... N+M, as previously mentioned. But, of course, the array and source geometry is always known at the recording truck 11 provided the positional locations 300, 301 ... P of FIG. 1 for the particular active array N, N+1 ... N+M, are correctly identified and recorded during each recording cycle, via operation of the ground position controller 20 of the present invention; of particular importance is the manipulation of data associated with the field geometry of the sensors 13 and source 16 via geometrical algorithms stored within microcomputer 25 of the controller 20.

As previously mentioned, microcomputer 25 is used to predict correct array positions as the rollalong switch 23 switches between "active" and "inactive" arrays of sensors. The microcomputer 25 can also interact with the rollalong swich 22, provided the latter is capable of accepting the multi-bit codes conventionally generated by the microcomputer 25. (In this regard, an approved roll-along switch is manufactured under the tradename "Rolalong Switch", by Input-Output, Inc., Houston, Tex., and consists of a series of contacts attached to a central shaft of a stepping motor controlled via a digital input code from the microcomputer 25.)

Rollalong switch 22 usually includes a display (not shown) associated with one or two of the locational positions of the active array of sensors 13. Such display, of course, changes as the active array changes sequential pattern in the manner of N, N+2 ... N+M, as shown in FIG. 1. The rollalong switch 22 also includes a digital generator (not shown) for generating a second multi-bit code indicative of the position P of a member of the array at the recorder 21. However, as previously mentioned, the latter digital code represents only an arbitrary number and is not a true geodytic location.

FIG. 3 illustrates microcomputer 25 of controller 20 in still more detail.

As shown, the microcomputer 25 includes a system bus 28 used to connect via I/O interfacing array 34, encoders 26 and displays 27 to microprocessor unit 30 (MPU) of the microcomputer 25. Also connected via the bus 28 and ports 29 are interrupt controller 31, RAM 32, ROM 33 (in addition to I/O interfacing array 34), which operates in conventional fashion to calculate, manipulate, store and display position data associated with the exploration operations. Note that the I/O array 34 not only links the MPU 30 with the encoders 26 and display 27, but it is also used to provide data to the printer 35 under control of MPU 30 to generate a permanent record of the displayed data at displays 27, if desired.

Bus 28 essentially comprises three separate buses, a data bus, an address bus and a control bus. The data bus is conventional: it not only carries the usual information to and from MPU 30, but it's also used to fetch instructions (that have been stored in ROM 33) as required, as well as carries data from/to the encoders 26 and displays 27 of FIG. 2, by way of (or independent of) RAM 32.

Addressing data is the annotational function of the address bus. It is capable of selecting a location in RAM 32 or ROM 33 or a particular address in the MPU 30 when appropriately signaled, say by interrupt controller 31. The control bus controls the sequencing and nature of the operation using common selector commands, e.g., "Read", "Write", etc.

Additionally, it should be noted that system interrupts are usually carried via the control bus of the system bus 28 to implement the scheduling and servicing of different ports, as required by operations. In the present invention, interrupt controller 31 handles seven (7) vectored priority interrupts for the MPU 30, as explained in detail below. In servicing the interrupts, preservation of program status is required and is easily carried by the MPU 30 in conventional manner. Since the controller 31 is both vectored and priority oriented, it has the responsibility of providing vectored interrupts to the MPU 30, of identifying the nature of the interrupt, (or its branching address) and of establishing priority between competing interrupts.

FIG. 4 illustrates the nature of the data provided at encoders 26 and displays 27.

The operator initially calibrates positions of the exploration array and source with previously surveyed geographical stations. Information encoded via the encoders 26 for use within microcomputer 25 before operations begin, includes:

(i) truck location (vis-a-vis survey stations of known geographic location) encoded at sub-element 40;

(ii) slave truck location (if applicable) encoded using sub-element 41;

(iii) reference station location (where the end of the spread is initially positioned) encoded at sub-element 42;

(iv) initial location of the energy source stored at sub-element 43;

(v) the number of shots or sweeps encoded at sub-element 44;

(vi) the initial gap position, stored at sub-element 45;

(vii) the gap spacing encoded at sub-element 46 and (viii) gap roll increment stored at sub-element 47.

The operator also has the initial responsibility of encoding other data which, for the most part, does not change during the survey. In this regard, the operator may have to only initially encode shot depth and size (at sub-elements 48 and 49), shot direction and offset (at sub-elements 50 and 51) as well as data related to the spread, as to its direction (at sub-element 52) and the distance between groups (at sub-element 53).

Switch arrays generally indicated at 54 and 55 are also set by the operator. Data provided by these switch arrays, relate to two or three possible switch states of the switches 56–66 which are, for example, related to the type and circumstances of the field survey.

[In this regard, the functions of the switches are as follows: Switch 56 specifies line direction; switch 57 specifies truck rank, i.e. determines if the reference truck is the master (or slave) in relationship with an alternate truck; switch 58 specifies operations in either a serial or in a parallel mode, the mode being related to whether one or two arrays of geophones are used in-line or parallel to the corresponding source line; pushbutton switches 59 and 60 relate to start up and to alarm reset functions respectively; switch 59, of course, initializes operations after all synchronization has been completed; switch 60 turns off the audio alarm in the event that an audio-indicating signal of some importance has been generated causing the alarm to be activated; transmit switch 61 "triggers" the energy source and is operative only after the operator is assured the correctness of the array and source positions as displayed at displays 27; switches 62 and 63 related to (i) the "trigger" link associated with the activation of the source (electrical wire-line or radio) and (ii) whether or not the roll switch 22 (FIG. 2) is to be in an active or passive state. Three-position switch 64 establishes whether or not the operation is to be in a manual, automatic or test mode; update switch 65 operates only when the switch 64 is in the manual mode and is used (in manual mode) to initiate advances of the roll switch so as to generate new ground locations for the array after the recording cycle has been completed; and switch 66 is a conventional power-on switch.]

Displays 27 may be conventional LED segmented displays except that they are microcomputer implemented. Primary purposes of the displays 27: to provide data to the operator so that determinations as to whether or not the system is functioning correctly can be made, and to allow the operator to act as an independent cross-checker of the correctness of the displayed ground locations. The data at displays 27 relate for the most part to the type of run being undertaken and survey conditions.

[In this regard, the nature of the displays 27 is as follows: subdisplays 70 and 71 indicate shot location and number of shots per location, respectively; subdisplays 72–75 relate to geographic locations of the active array as a function of time; subdisplay 76 specifies the position of the slave reference; status subdisplay 77 specifies (by code) the occurrence of certain activities during the exploration operation which may be accompanied by an audio alarm to indicate the immediate need for operator intervention, the meaning of the code displayed at the status subdisplay 77 being as set forth below, in Table I.

TABLE I

| Code | Activity |
| --- | --- |
| 0 | Setup for sequence start operation |
| 1 | Geometrical mistie |
| 2 | Ready for update or update in progress (if in auto mode) |
| 3 | Roll Switch Moving |
| 4 | Roll Switch (Stopped; in position) |
| 5 | Roll Switch Disabled |
| 6 | Slave Reference Code Received |
| 7 | Transmission Reference Error (slave reference code not received) |
| 8 | Load Ref Output At Shift Register |
| 9 | Transmit (one bit of ref. code) |
| A | Gap Set mistie |
| D | Occurrence of Last Shot |
| 1X | Beeper On With Status Displayed as to Code 0, 1, . . . 9, A, D, alone. |
| 53 | Step Roll Switch Up With Beep on and Code "3" |
| 93 | Step Roll Switch Down With Beep on and Code "3". |

Explanation of Table I: status code "0" occurs any time that the controller 20 is powered up to cue the operator that all input data at the encoders 26 must then be set. Sequencing start button 59 terminates the cueing operation; status code "D" indicates that the last shot position is at hand and thus, the truck location and connection station vis-a-vis the array must be changed; status codes "3", "4", "5" and "53" and "93" indicate certain roll switch activities. If there are errors in the programmed exploration activity, warning codes are also generated by the status codes "1"; and "7".]

OPERATIONAL SEQUENCE

Assume the operator has initially calibrated the start-up positions of the array and source with the surveyed locations. As previously indicated in regard to FIG. 4, this entails encoding of positional data via encoders 26 in conjunction with proper setting of the switching arrays 54, 55. The result: corresponding shot, spread and associated data appear at the displays 27 due to the interaction of data relationship established through operation of the microcomputer 25 of FIG. 2. In order to better understand how the present invention uses all data, perhaps a brief overview of the hardware aspects of the microprocessor 30 is in order and is presented below in connection with FIG. 5.

It should be initially noted that MPU 30 is preferably an Intel 8085 microprocessor, a product of Intel Incorp., Cupertino, Calif. As is well known, it has a microprocessor and controller integrated into a single chip. It also includes an array of registers 82 tied to an ALU 83 via an internal data bus 84 controlled via control unit 85. Program counter 86 and instructional register 87 have dedicated uses; the other registers, such as accumulator 88, have more general uses. In the 8085, expanded control functions result because the low-eight (8) address bits have the capability of being multiplexed. Such operation occurs at the beginning of each instructional cycle; the low-eight address lines appear via ALE line 89 for control of different elements of the location, including encoders 26, displays 27, and printer 35 through I/O interface array 34 of FIG. 6.

As shown in FIG. 6, while the I/O array 34 is conventional, it must be capable of handling a series of 8-bit independently addressable codes. For this purpose, it preferably comprises a multiplicity of 8-bit I/O port chips indepedently addressable via ALE line 89 of FIG. 5 of the MPU 30. Each 8-bit I/O port chip preferably comprises an 8-bit latch combined with a 3-state output buffer in which each can be separately driven. In determining location of data via address decoder 38, the MPU 30 also must manipulate the data using known geometrical relationships in which encoded positional data can be translated as required, depending on several factors.

Assume the survey has just been started; the operator has encoded all pertinent data via the encoders 26. Also switch arrays 54, 55 have been properly set. Initially the control and reference location position data from encoders 26 (and the switch arrays) are fetched by the MPU 30. The MPU 30 next performs the required manipulation of that data to define spatial array and source geometries of interest in the manner of FIGS. 7A and 7B. Such manipulation of data includes execution of the steps associated with the basic power-up routine of FIG. 7A and the sequence start routine of FIG. 7B, including accessing the calculated data to displays 27 for operator perusal.

DATA ARRANGEMENTS AT DISPLAYS 27

Values of data appearing at displays 27 of FIG. 4 are of course dependent upon use of certain geometrical equation sets, viz. equation sets I, II, III and IV set forth below, stored in the MPU 30 and selectively utilized by the controller 20 as required.

SEQUENCE START EQUATION SET I

Assume both the ground location numbers and data channel numbers increasing along the seismic line in the direction of arrow 18; accordingly the following set of equations control operations:

(1) $RLSP = REF - NP - TR$

-continued

```
(2) END 1 = REF
(3) END 2 = REF+GPNO+K-1
    If GPNO = 0
(4) GAP 1 = 0
(5) GAP 2 = 0
    If GPNO > 0
(4) GAP 1 = REF+GPLOC-1
(5) GAP 2 = REF+GPLOC+GPNO
(6) ROOM = TR-REF-GPNO+1
```

Table II, below, defines the notations used above in connection with Equation Set I.

TABLE II

| Notation | DEFINITION |
|---|---|
| SHLO | Energy source location |
| SHNO | Energy source number |
| REF | Location of reference sensor |
| ROOM | No. of rollalong switch positions available for advancing the active spread |
| TR | Ground reference for recorder location |
| PNO | Number of geophone groups in the GAP |
| GPLOC | Location of the GAP |
| K | Number of data channels in recording system (24, 48, 60, 96, 120, etc.) |
| END 1 | Ground location of the geophone group interconnected through the rollalong switch to the first data channel of the recorder. |
| END 2 | Ground location of the Kth data channel |
| GAP 1 | Ground location of the data channel below the GAP on the first data channel side. |
| GAP 2 | Ground location of the data channel above the GAP toward the Kth channel. |
| RLSP | Rollalong switch position required for a desired active spread location. |
| NP | Number of rollalong switch positions available minus 1. (N-1). Rollalong switch must be configured for K+N inputs and K outputs. |
| GL(+) | Ground location numbers along the seismic line increasing numerically in the direction in which the active geophone array is advanced for each successive record sequence. |
| GL(-) | Ground location numbers decreasing numerically in the direction in which the active spread is advanced. |
| CH(+) | Seismic data channel increasing (1 to K) numerically along the active spread in the direction in which the active spread is advanced. |
| CH(-) | Seismic data channels numerically decreasing (from K to 1) in the direction in which the active spread is advanced. |

Note that the sign (+) (-) of each of the ground location numbers (GL) signifies its relationship with respect to the direction of the array advance; the reference sensor and the sign of the channel number are also dependent on the array reference status. If the latter is 1, the CH is positive. If not, then the sign is negative.

SEQUENCE START EQUATION SET II

With the ground location numbers increasing but the channel numbers decreasing, the following set of equations is used:

```
(1) RLSP = TR-REF-GPNO+1
(2) END 1 = REF+GPNO+K-1
(3) END 2 = REF
    If GPNO = 0
(4) GAP 1 = 0
(5) GAP 2 = 0
    If GPNO > 0
(4) GAP 1 = END 1-GPLOC-1
(5) GAP 2 = END 1-GPLOC-GPNO
(6) ROOM = TR-REF-GPNO.
```

SEQUENCE START EQUATION SET III

With ground location numbers decreasing but the channel numbers increasing, the following set of equations is used:

```
(1) RLSP = TR+NP-REF
(2) END 1 = REF
(3) END 2 = REF-(K-1)-GPNO
    If GPNO = 0
(4) GAP 1 = 0
(5) GAP 2 = 0
    If PPNO > 0
(4) GAP 1 = REF-GPOC-1
(5) GAP 2 = REF-GPLOC-GPNO
(6) ROOM = REF-TR-GPNO+1
```

SEQUENCE START EQUATION SET IV

With both ground location numbers and channel numbers decreasing, the following set of equations is used:

```
(1) RLSP = REF-TR-GPNO+1
(2) END 1 = REF-(K-1)-GPNO
(3) END 2 = REF
    If GPNO = 0
(4) GAP 1 = 0
(5) GAP 2 = 0
    If GPNO > 0
(4) GAP 1 = END 1+GPLOC-1
(5) GAP 2 = END 1+GPLOC+GPNO
(6) ROOM = REF-TR-GPNO
```

Following these operations, the operator peruses the display data; if it is correct, he activates trigger switch 61 (FIG. 4) to cause the energy source 16 (FIG. 1) to be activated. Thereafter, there is transference of all pertinent parameter data to the digital field recorder 21 of FIG. 2. Record formatting at the header section of the seismic tape follows standard practice guidelines defined by the Society of Exploration Geophysicists Technical Standards Subcommittee on Tape Formats.

After the digital field recorder 21 of FIG. 2 has also recorded the field data, the microcomputer 25 then recalculates the next in-line array and source geometry and accesses the new data to displays 27 for operator perusal and the process is repeated.

It should be understood that the invention is not directed to specific embodiment set forth above, as many variations are readily apparent to those skilled in the art, so thus the invention is to be given the broadest possible interpretation within the terms of the following claims.

What is claimed is:

1. Method of calculating, storing and displaying positional data, associated with a digital exploration system during generation and collection of seismic data by a source-detector array positioned at known locations along a line of survey at the earth's surface, said positional data including information related to both detector and source locations relative to each other and to a reference location, and being generated as bits of digital data in a microcomputer system including a microprocessor unit (MPU), memory units and a series of display/storage devices interconnected to each other and to a digital field system (DFS) via a system bus, whereby errors in exploration activity—both pre-activation and post-release of energy from said source—are substantially reduced, comprising (a) encoding and automatically storing additional digital data related to array geometry and exploration parameters that allow repetition in sequence of activities along said line, said encoded and stored parameters including both source and detector locations relative to each other and to a reference location, (b) automatically displaying at least a portion of said encoded data in alpha-numeric form for operator examination and for correction, if required, (c) automatically generating via said microcomputer system further additional data related to array parameters based in part on data encoded as (a), and previously stored data related to exploration parameters, said additional data including at least positional data related to end-positions of active detectors along said line of survey, and (d) displaying at said display/storage devices of said microcomputer system at least a portion of said new array parameters of (c) for operator examination and correction, if required, whereby errors in exploration activities can be substantially reduced, prior to activation of said source of said array.

2. Method of claim 1 in which (a) includes encoding as bits of digital data in said microcomputer system truck position vis-a-vis said known geographical positions along said line of survey.

3. Method of claim 1 with the additional steps of (i) assuming that the displayed data of steps (b) and (d) meet with operator approval transmitting a firing command to said DFS whereby seismic waves are generated by said source and propagate through an earth formation and in which reflections of said generated waves are detected by said array of detectors, followed finally by recording indications of said received waves at a recording unit of said DFS, (ii) in response to a generated command signal, recalculating next-in-line array and source positional parameters for operator approval using said MPU of said microcomputer system, (iii) displaying said parameters of (ii) for operator examination.

4. Method of claim 3 with the additional step of repeating steps (i), (ii) and (iii) whereby yet additional next-in-line exploration parameters can be sequentially generated and examined as said array is positioned and repositioned along said line, and seismic data is recorded sequentially.

5. Method of claim 1 in which all data is collected and recorded via a single survey truck.

6. Method of claim 1 in which (b) includes alphanumeric displays of said positional data at said display/storage devices, so as to depict truck position along said line, reference location of said array, shot location along said line, gap position along said line, gap number and rollalong number.

7. Method of claim 1 in which (d) includes displays of positional data at said display/storage devices of said microcomputer system related to shot occurrence count, array end position, and channel recorder count.

8. A ground position controller for manipulating calculating, storing and displaying positional data, associated with a digital exploration system during generation and collection of seismic data by a source-detector array positioned at known locations along a line of survey at the earth's surface, whereby errors in exploration activity—both pre-activation and post-release of energy from said source—are substantially reduced, said positional data including information related to both detector and source locations relative to each other and to a reference location, and being generated as bits of digital data comprising a microcomputer system including a microprocessor unit (MPU), memory units and a series of display/storage devices interconnected to each other and to a digital field system (DFS) via a system bus, said display and storage devices having separate encoding means for automatically encoding digital data related to array geometry and exploration parameters that allow repetition in sequence of activities along said line of survey, and separate display means for automatically displaying at least a portion of said encoded data in alpha-numeric form for operator examination and for correction, if required, said separate encoding means including but not limited to sub-encoding elements for encoding information associated with both detector and source location relative to each other and to a reference location, said displayed data at said separate display means being automatically generated via said microcomputer system using data related to array parameters based in part on encoded data, previously stored data related to exploration parameters, and newly generated array parameters whereby errors in exploration activities can be substantially reduced; said displayed data being at least associated with source and detector positions relative to each other and vis-a-vis said known geographical positions along said line of survey.

9. Controller of claim 8 in which said separate encoding means includes an additional element sub-encoding for encoding as bits of digital data truck position vis-a-vis said known geographical position along said line of survey.

10. Controller of claim 8, with the addition of synchronization linkage means connected to said system bus, whereby assuming that the displayed data at said separate display means meet with operator approval, a firing command is generated for transmission to said DFS whereby seismic waves are generated by said source and propagate through an earth formation and reflections of said generated waves, are detected by said array of detectors, followed finally by recording indications of said received waves at a recording unit of said DFS.

11. Controller of claim 10 in which said DFS generates a command signal for said MPU after said received waves have been recorded at said recording unit whereby said MPU recalculates next-in-line array and source positional parameters for operator approval and causes said parameters to be displayed for operator examination at said separate display means.

* * * * *